May 30, 1967 E. WILDHABER 3,321,935
GEAR COUPLING
Filed Jan. 25, 1965
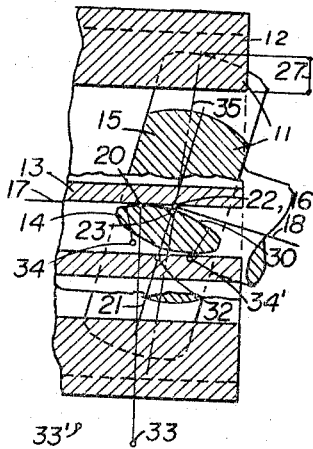
FIG. 1
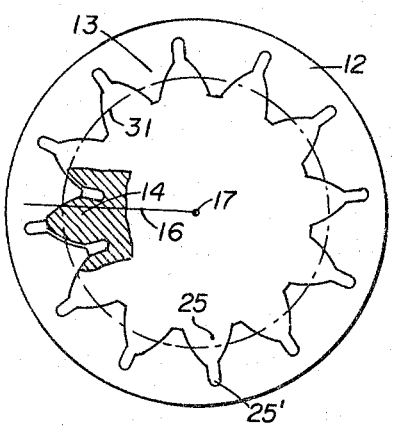
FIG. 2
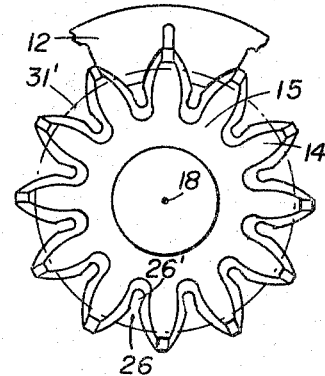
FIG. 3
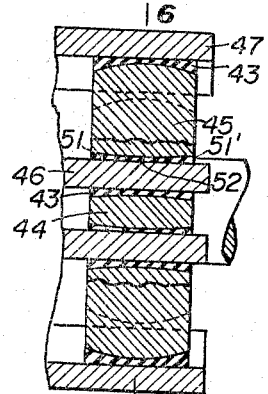
FIG. 5
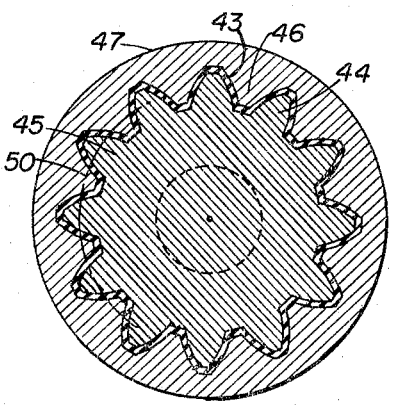
FIG. 6
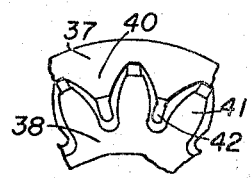
FIG. 4
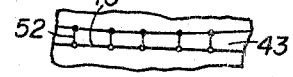
FIG. 9
FIG. 10
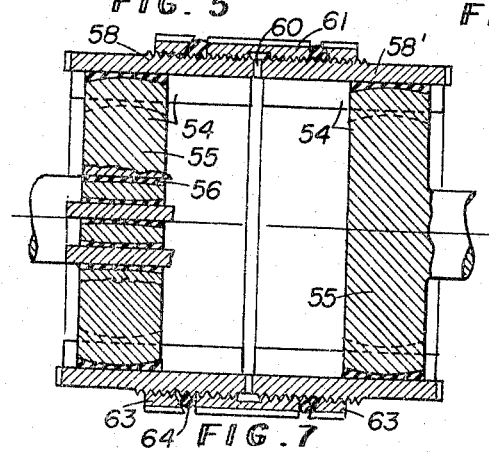
FIG. 7
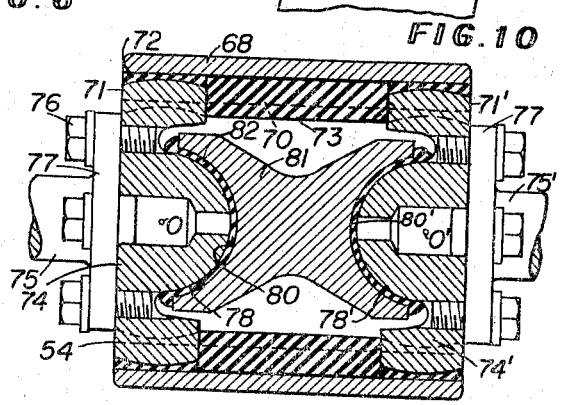
FIG. 8
INVENTOR:
Ernest Wildhaber

United States Patent Office 3,321,935
Patented May 30, 1967

3,321,935
GEAR COUPLING
Ernest Wildhaber, Brighton, N.Y.
(124 Summit Drive, Rochester, N.Y. 14620)
Filed Jan. 25, 1965, Ser. No. 427,655
5 Claims. (Cl. 64—9)

The present invention relates to gear couplings for transmitting torque between two shafts so as to permit a range of angularities between said shafts. Particularly it relates to couplings comprising a sleeve member with straight teeth internally provided thereon and a hub member having external and usually crowned teeth extending in the spaces between said straight internal teeth. The tooth profiles of these members are preferably curved and may be of involute shape or arcuate shape.

At shaft angularity such couplings contact in two diametrically opposite regions, while the teeth separate between said regions, at least if the coupling members are absolutely rigid. The separation reaches a maximum ($z_0$) about midway between said two regions.

The said maximum separation depends on the shaft angularity or departure from alignment, and is approximately proportional to the square of the shaft angularity. Thus at ½ deg. shaft angularity $z_0$ is about one quarter of the amount it has at one deg. shaft angularity; and at ¼ deg. shaft angularity it is one sixteenth of the amount at one deg. shaft angularity. At small shaft angularities elastic deflection or deformation of the contacting teeth materially increases the number of teeth in driving contact.

One object of the present invention is to provide means for increasing the elastic deformation, so as to increase the number of teeth in driving contact, thereby decreasing the load and stress on the individual teeth, to achieve longer life or increased load capacity.

I may achieve this aim in two ways, either by increasing the tooth depth way beyond the depth of tooth engagement, to obtain increased bending of the teeth under load, or by providing a layer of elastic deformable material between the contacting tooth sides. The material may be for instance rubber, natural or artificial, bonded to at least one of said two coupling members.

A further object is to provide a gear coupling and a gear coupling unit capable of transmitting axial thrust as well as torque.

Gear couplings of the type referred to transmit true uniform motion if correctly made. At shaft angularity they move like a pair of gears whose axes intersect. Their relative motion is at any instant like a turning motion about an instantaneous axis that bisects the angle between the axes of the two coupling members. Relative sliding is about the instantaneous axis. It causes a friction moment about said axis that is often bothersome. It is a further object of the invention to minimize this friction moment, especially at small shaft angularities.

Still another aim is to devise a coupling for small shaft angularities that requires no lubrication.

The sustained load capacity of current gear couplings decreases sharply with increasing shaft angularity. This is because of the fewer teeth in contact, because of the decreased intimacy of contact and because of increased sliding of the contacting tooth sides. In many couplings a range of shaft angularities is specified for operation under load and an additional range for operation without load.

A further aim of the invention is to provide a structure which substantially increases and more nearly equalizes the capacity within the load range while providing decreased capacity in the no-load range.

These aims may be attained singly or in any combination.

Embodiments of the invention will now be described with the accompanying drawing, in which FIG. 1 is an axial section of a gear coupling shown at exaggerated shaft angularity, and partly a section taken along a mean cylindrical surface or pitch surface (31, FIG. 2), developed into a plane and showing one hub tooth and two sleeve teeth.

FIG. 2 is a view taken along the axis of the sleeve member 12 of this coupling and a fragmentary section through the mating hub member.

FIG. 3 is an axial view of this hub member, showing also the sleeve member fragmentarily and in aligned position.

FIG. 4 is a fragmentary axial view of a slightly modified form of gear coupling.

FIGS. 5 and 6 illustrate another embodiment of my invention.

FIG. 5 is an axial section of a gear coupling, shown with axes in alignment, and also showing a fragmentary section taken along a mean cylindrical surface (50, FIG. 6), developed into a plane. FIG. 6 is a cross-section taken along line 6—6 of FIG. 5.

FIG. 7 and FIG. 8 are axial sections showing two forms of coupling units or gear-coupling pairs, the individual couplings being of the general type shown in FIGS. 5 and 6, FIG. 7 further showing fragmentarily a mean cylindrical section through the coupling teeth, developed into a plane.

FIGS. 9 and 10 are diagrams illustrating the action of this coupling type at low shaft angularities.

Gear couplings are usually arranged in pairs. But where the novelty resides in the structure of the individual couplings, it is sufficient to describe one coupling of the pair.

Coupling 11, FIGS. 1 to 3, comprises a sleeve member 12 with straight internal teeth 13. They are engaged by the crowned external teeth 14 of a hub member 15 that is shown at exaggerated shaft angularity in FIG. 1, the teeth 14 extending in the spaces between the straight teeth 13.

At shaft angularity the mating teeth engage in two diametrically opposite regions near the perpendicular 16 to the plane of the axes 17, 18 of the sleeve and hub. Thus point 20, FIG. 1, may be a point of contact in one of the two regions. In the mid-plane 21 of the hub, the teeth contacting at 20 have a separation $z_0$, which is the distance between sleeve point 22 and hub point 23. As the coupling rotates, the sleeve about axis 17 and the hub about axis 18, the previously contacting teeth separate and then again approach each other, to contact again after half a turn.

It can be demonstrated mathematically that the maximum tooth separation attained is approximately equal to $z_0$. This is a very small distance at small shaft angularities, so that tooth bending and compression of the tooth surfaces materially increase the number of teeth in simultaneous contact. The percentage gain increases with decreasing shaft angularity.

In most couplings the tooth surface stress is the limiting factor rather than the breaking strength of the teeth.

In accordance with the present invention the yielding of the teeth, their elastic deformation, is deliberately increased. Extra deep spaces are provided between the teeth 13, 14. Thus the tooth spaces 25 of the sleeve member have extensions 25'. And the tooth spaces 26 of the hub member have extensions 26', so that the teeth are deeper than the maximum depth 27 of tooth engagement by at least one third of depth 27.

The sleeve teeth 13 with their extra deep tooth spaces can be broached in one operation. The hub teeth 14 can be milled or cut with oscillatory tools. Or else straight slots can be applied by a broach, and the sides of the crowned teeth may then be produced in a separate operation as by hobbing.

FIG. 1 also illustrates a preferred form of crowning of the hub teeth, without however confining the invention to this form. The pitch lines or longitudinal profiles 30 of the teeth 14, in a mean cylindrical section 31′ (FIG. 3) developed into a plane, have a varying curvature. At midpoint 23 the curvature center is at 32, and 23–32 is the curvature radius. The curvature radius increases from the center towards the ends of the teeth. At point 20 the curvature center is at 33, and 20–33 is the curvature radius, more than 50% larger than the curvature radius 23–32. Point 20 corresponds to the maximum shaft angularity under load. Often still larger shaft angularities are specified for running without load. To accommodate such larger loadless angularities a smaller curvature radius is sufficient. Thus adjacent the tooth ends the curvature center is at 34, the curvature radius being smaller than that at the mid-plane. In this way only a small tooth length is used up for the additional no-load shaft angularity. The tooth length is used to best advantage.

It should be understood that the center portion of the hub teeth 14 contacts at zero shaft angularity, and that the tooth contact moves away from the tooth center increasingly with increasing shaft angularity. Conventionally, the pitch lines 30 have an approximately constant curvature radius. The coupling is then at a disadvantage increasingly with increasing shaft angularity. This is because of the fewer teeth in contact, of the decreased intimacy of contact and of the increased tooth sliding. Tooth sliding is about the instantaneous axis of relative motion, shown at 35 in FIG. 1. It is approximately proportional to the shaft angularity. The described varying curvature radii tend to make up at least partially for this deficiency.

The depth proportion of the tooth spaces of the sleeve and the hub is preferably made so that the tooth inclination angle caused by bending is about equal on the sleeve and hub, so that the mesh is undisturbed.

FIG. 4 illustrates an embodiment where for instance a nylon sleeve 37 is used that meshes with a steel hub 38. The nylon teeth 40 tend to bend far more under a given load. To achieve the same bending angle I may use nylon teeth 40 of conventional depth and match them with steel teeth 41 of extra depth. 42 denotes the extension of the tooth space.

*Further main embodiment*

Another embodiment will now be described with FIGS. 5 and 6. Here the additional elastic deformation is achieved with a layer 43 of elastic deformable material bonded to the tooth sides of one or both members of the coupling.

The preferably crowned teeth 44 of the hub 45 contact the sides of the straight teeth 46 of the sleeve 47 through a layer 43 of rubber-like material. The extra depth of the teeth may here be dispensed with. Layer 43 is preferably bonded to the hub, or to both hub and sleeve when the shaft angularities are quite small.

The mid-portion of FIG. 5 is a mean cylindrical section 50, FIG. 6, coaxial with the coupling, developed into a plane. It shows up the crowning of the hub teeth 44. Because of this crowning the layer 43 is thicker adjacent the opposite free ends 51, 51′ of the hub teeth than at the tooth middle 52. One side of the layer 43 matches the straight teeth of the sleeve and extends along parallel straight lines.

FIGS. 9 and 10 describe the action of the layer 43 at zero and at a small shaft angularity respectively. FIG. 9 shows lines 52 marked on the layer at right angles to side 46′. These lines assume an oblique position 52′ at shaft angularity, FIG. 10, where sliding exists principally lengthwise of the teeth. As the layer is flexible it opposes such displacement only with a slight force. This force decreases with decreasing shaft angularity. Thus there is almost no friction at really small shaft angularities.

In conventional gear couplings the friction moment depends on the coefficient of friction, whether sliding is small or large, so that the friction moment does not disappear at really small shaft angularities.

Also this layer type coupling requires little lubrication for small shaft angularities. The layer itself is the lubricant. No grease or oil lubrication is required particularly where the elastic deformable layer is bonded to both the sleeve and the hub. Neither are any seals required then.

The coupling unit shown in FIG. 7 comprises a pair of spaced couplings 54, each have a hub member 55 contacting the teeth of its sleeve through a layer 56 of elastic deformable material. Layer 56 is best shown at the left center of FIG. 7, which shows a development of a mean cylindrical section, while the outer parts of FIG. 7 are an axial section. The sleeve portions 58, 58′ meshing with the two hub members are coaxial and rigid with each other. They are connected by a tooth face coupling 60 of known design, kept in rigid engagement by a nut 61 that engages threads of opposite hand provided on portions 58, 58′. Further nuts 63 may serve for compressing sealing rings 64 in case lubricant is used.

FIG. 8 illustrates an embodiment of a coupling unit capable of transmitting axial thrust as well as torque. It employs a one-piece sleeve member 68 whose teeth 70 extend from one end 71 to the other end 71′. To facilitate moulding, applying the layer 72, a preformed center piece 73 of elastic deformable material may be inserted between the two hub members 74, 74′. The hub teeth, the sleeve teeth, and the layer 72 are like those of the embodiment described with FIG. 7. The layer may be bonded to both hub and sleeve.

The hub members 74, 74′ are rigid with shafts 75, 75′ respectively. They may be secured thereto with screws 76 applied at a flange 77 of said shafts. The hub members 74, 74′ have convex spherical end portions 78, 78′ facing each other and centered at the hub centers O, O′. Portions 78, 78′ are matched with counterpart spherical end portions 80, 80′ provided on a connecting element 81. The convex and concave spherical portions contact through an intermediate elastic deformable layer 82 that is bonded to both.

Thus axial pressure towards each other may be transmitted between the hub members, and to a lesser extent also axial tension away from each other. The latter is limited by the strength of the bond. At the same time limited angular displacement about centers O, O′ is feasible, that is gear-coupling action.

I claim:

1. A gear coupling for coupling two parts for rotation together and permitting moderate shaft angularities, comprising a sleeve portion having a set of internal teeth of concave profile, a hub member having external teeth extending into the spaces between said internal teeth, and a layer of elastic deformable material bonded to at least one of said sets of teeth, so that engagement between said teeth is through said material, the thickness of said layer at the center of the intermeshing tooth sides being less than half the thickness of the teeth of said hub member in a mean cylindrical section coaxial with said hub member, the diameter of said mean cylindrical section being the average of the diameter of the sleeve teeth at their tops and of the extreme outside diameter of the hub teeth, and the thickness of said layer in the mid-plane being less than one-twelfth of the radial distance of said layer from the axis of rotation of the coupling.

2. A gear coupling permitting moderate shaft angularities, comprising a sleeve member having a set of internal teeth, a hub member having external teeth extending in the spaces between said internal teeth, and a layer of elastic deformable material bonded to at least one of said sets of teeth, so that engagement between said teeth is through said material, the thickness of said layer at the center of the intermeshing tooth sides being less than half the thickness of the teeth of said hub member in a mean cylindrical section coaxial with said hub member, the diameter of said mean cylindrical section being the average of the diameter of the sleeve teeth at their tops and of the extreme outside diameter of the hub teeth, said sleeve member having straight teeth and said hub member having teeth crowned lengthwise, and said layer of elastic deformable material being bonded only to said hub member and having an outside surface extending along parallel straight lines to match the side surfaces of said straight teeth, so that it is thicker adjacent the opposite ends of the hub teeth than at the middles of the hub teeth.

3. A coupling unit comprising a pair of spaced gear couplings, each of which comprises a sleeve member having a set of internal teeth, a hub member having external teeth extending in the spaces between said internal teeth, and a layer of elastic deformable material bonded to at least one of said sets of teeth, so that engagement between said teeth is through said material, the thickness of said layer at the center of the intermeshing tooth sides being less than half the thickness of the teeth of said hub member in a mean cylindrical section coaxial with said hub member, the diameter of said mean cylindrical section being the average of the diameter of the sleeve teeth at their tops and of the extreme outside diameter of the hub teeth, said sleeve members being coaxial and rigid with each other, the hub members of said pair having convex spherical end portions facing each other, an element with counterpart concave spherical end portions, and an intermediate elastic deformable layer connecting each of said convex portions and its concave counter-part.

4. A gear coupling permitting moderate shaft angularities, comprising a sleeve member having a set of internal teeth, a hub member having external teeth extending in the spaces between said internal teeth, and a layer of elastic deformable material bonded to at least one of said sets of teeth, so that engagement between said teeth is through said material, the thickness of said layer at the center of the intermeshing tooth sides being less than half the thickness of the teeth of said hub member in a mean cylindrical section coaxial with said hub member, the diameter of said mean cylindrical section being the average of the diameter of the sleeve teeth at their tops and of the extreme outside diameter of the hub teeth, said sleeve member having longitudinally straight teeth, said hub member having teeth crowned lengthwise, and said layer of elastic deformable material filling the spaces between adjacent tooth sides of said sleeve member and of said hub member and having a varying thickness along the length of said tooth sides, increasing in thickness from the centers toward both ends of the hub teeth.

5. A gear coupling member permitting moderate shaft angularities, comprising a sleeve member having a set of internal teeth, a hub member having external teeth extending in the spaces between said internal teeth, and a layer of elastic deformable material bonded to at least one of said sets of teeth, so that engagement between said teeth is through said material, the thickness of said layer at the center of the intermeshing tooth sides being less than half the thickness of the teeth of said hub member in a mean cylindrical section coaxial with said hub member, the diameter of said mean cylindrical section being the average of the diameter of the sleeve teeth at their tops and of the extreme outside diameter of the hub teeth, the teeth of said sleeve member having concave transverse profiles and the teeth of said hub member having convex transverse profiles.

References Cited

UNITED STATES PATENTS

| | | | |
|---|---|---|---|
| 1,435,141 | 11/1922 | Serrell | 64—9 |
| 1,940,884 | 12/1933 | Rosenberg | 64—11 |
| 1,942,782 | 1/1934 | Smith | 64—9 |
| 2,004,712 | 6/1935 | Thiry | 287—85 |
| 2,312,470 | 3/1943 | Julien | 64—11 |
| 2,338,758 | 1/1944 | Fast | 64—9 |
| 2,918,809 | 12/1959 | Miller | 64—9 |
| 2,922,294 | 1/1960 | Wildhaber | 64—9 |
| 2,924,954 | 2/1960 | Panhard | 64—9 |

FOREIGN PATENTS

| | | |
|---|---|---|
| 615,881 | 7/1935 | Germany. |
| 538,096 | 7/1941 | Great Britain. |
| 606,581 | 8/1948 | Great Britain. |
| 781,395 | 9/1957 | Great Britain. |

FRED C. MATTERN, JR., *Primary Examiner.*

HALL C. COE, *Examiner.*